April 17, 1962  J. E. GOLDRING  3,029,904
MOTION CHECKING CYLINDER
Filed Sept. 28, 1959  2 Sheets-Sheet 1
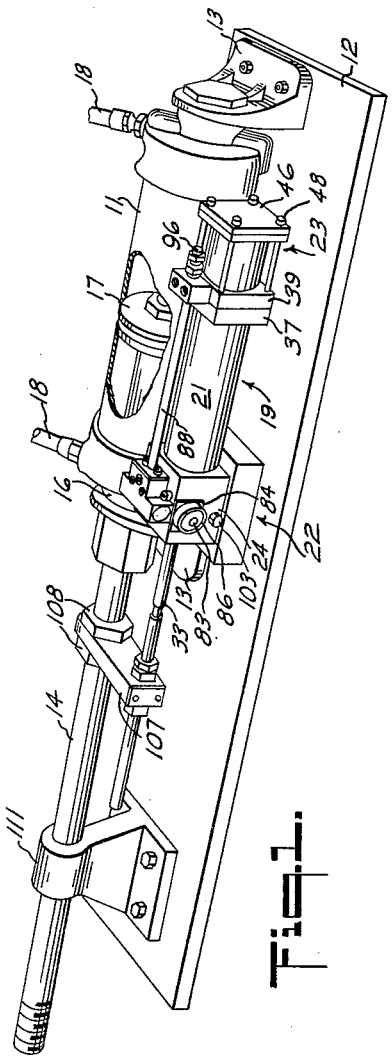
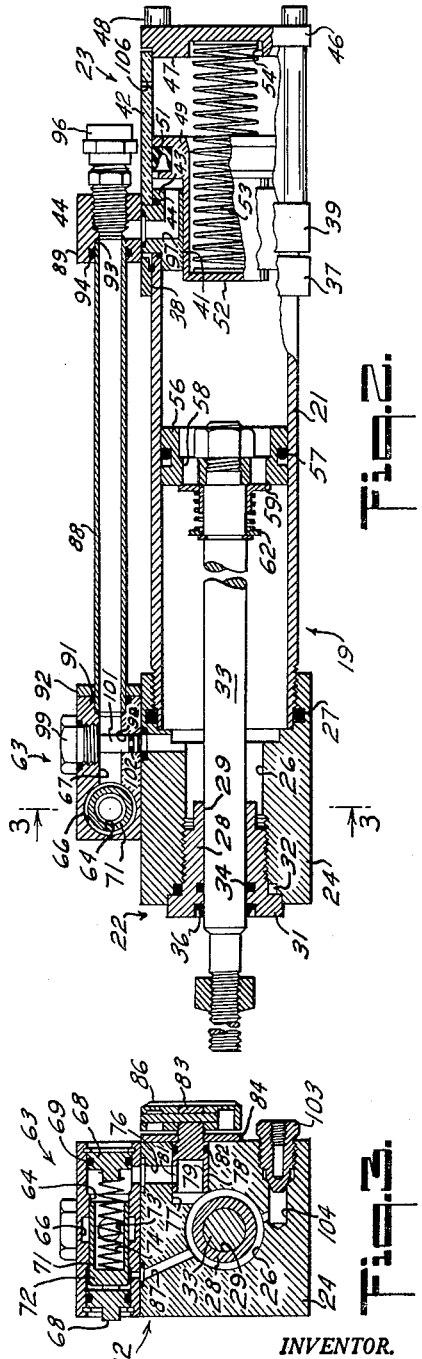
INVENTOR.
JOHN E. GOLDRING
BY
Gardner & Zimmerman
ATTORNEYS

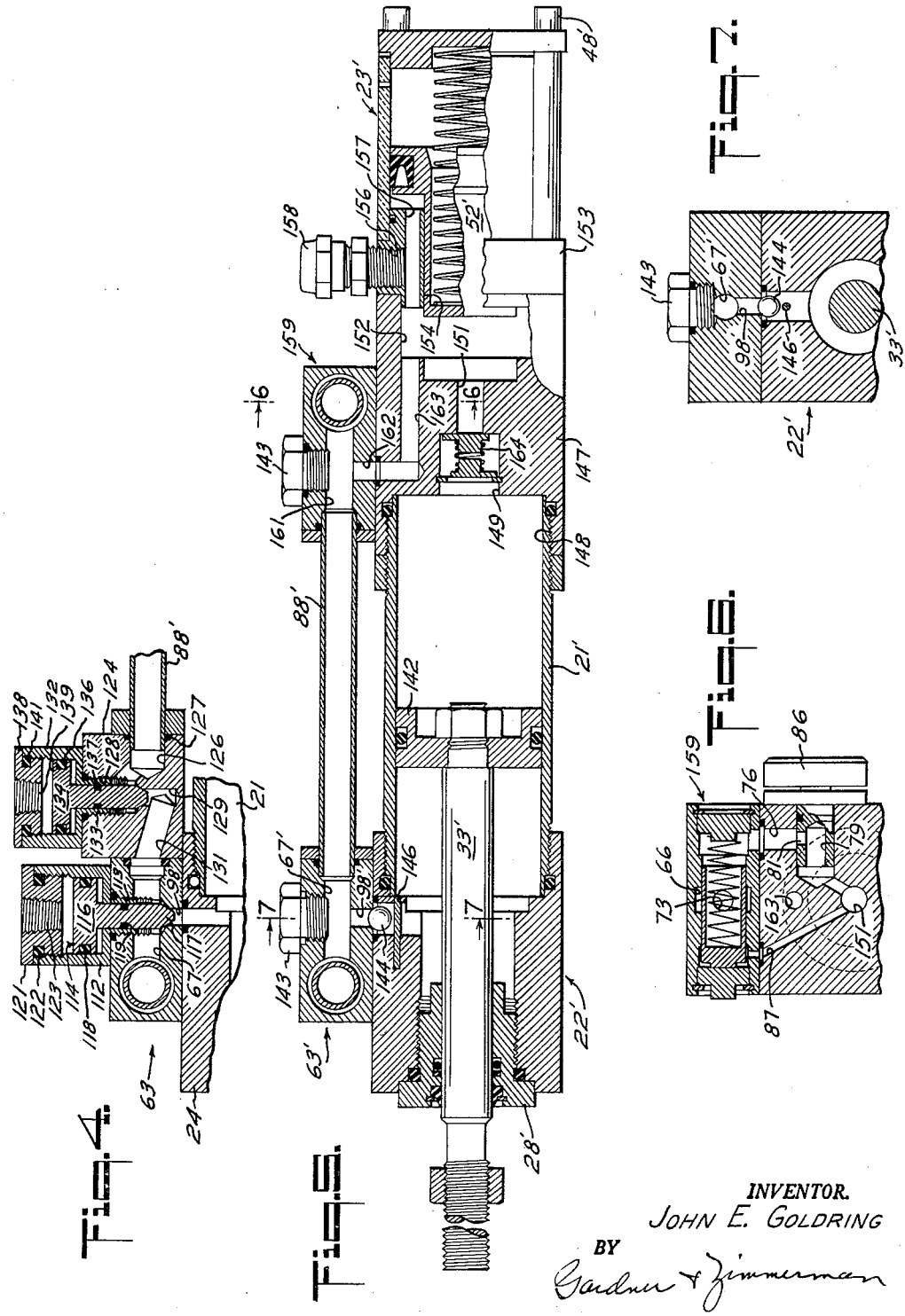

United States Patent Office 3,029,904
Patented Apr. 17, 1962

3,029,904
MOTION CHECKING CYLINDER
John E. Goldring, San Leandro, Calif., assignor to Modernair Corporation, San Leandro, Calif., a corporation of California
Filed Sept. 28, 1959, Ser. No. 842,789
6 Claims. (Cl. 188—97)

The present invention relates to fluid operated drive cylinders and more particularly to a motion checking device for use therewith whereby the power stroke of the drive cylinder may be maintained at a constant controlled velocity while working against a variable load.

Fluid powered drive cylinders are extensively used in both manually controlled and automatic machines to provide a reciprocating movement. Briefly such mechanism comprises a cylinder having a slidable piston therein and having means for admitting fluid under pressure to one end of the cylinder while the opposite end of the cylinder is simultaneously vented. A rod extends through a seal at one end of the cylinder and transmits movement of the cylinder to the load which is to be driven. It is a characteristic of drive cylinders, and particularly the pneumatic variety, that a variation in the resistance offered by the load in the course of a stroke will produce a corresponding velocity variation in the motion of the cylinder.

The foregoing effect results in part from the fact that the pressure on the piston is substantially constant and the effect is aggravated in the case of pneumatic cylinders by the compressibility of air. The results of a sudden change in velocity of the cylinder stroke will frequently be deleterious to the functioning of the apparatus which is being driven and may in some instances constitute a safety hazard. Thus, for example, if the cylinder is being used to drive a moving element of a machine tool the sudden movement resulting from cutting through the material being worked could damage the product and conceivably injure an operator.

Thus is is highly desirable in many applications of drive cylinders that means be provided for insuring that motion of the cylinder does not exceed a pre-determined rate irrespective of fluctuations in the load.

Accordingly the present invention provides a motion checking auxiliary cylinder which may be readily coupled to the primary drive cylinder and which will limit the rate of extension or contraction thereof to any selected velocity. The invention includes further provision whereby the motion regulation may be inactivated, either manually or automatically, for a selected portion of a stroke thereby allowing the drive cylinder to move rapidly for a controlled distance. Still a further property of the invention is provision for the instant and accurate stopping of motion of the drive cylinder which action cannot be accomplished with any precision by simply stopping the air flow to a pneumatic cylinder owing to the compressibility of the air.

It is therefore an object of this invention to provide a compact versatile mechanism for controlling the motion of a fluid powered drive cylinder.

It is a further object of this invention to provide an auxiliary motion checking cylinder with which the power stroke of a fluid operated drive cylinder can be limited to a pre-selected velocity.

It is another object of this invention to provide apparatus for counteracting the effects of load fluctuations on a fluid powered drive cylinder.

It is still another object of the invention to provide a power stroke velocity regulator for a fluid drive cylinder which regulator has provision whereby the velocity control may be inactivated for a selected interval permitting the drive to act rapidly for any selected portion of the power stroke.

It is another object of the invention to provide a mechanism for use with a pneumatic drive cylinder whereby the power stroke of the cylinder may be instantly and accurately stopped.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

Referring to said drawings:

FIGURE 1 is a perspective view of a pneumatic drive cylinder and showing a checking cylinder coupled thereto for controlling the rate of operation thereof.

FIGURE 2 is a longitudinal section view of the checking cylinder of FIGURE 1.

FIGURE 3 is a cross section view of the checking cylinder taken along line 3—3 of FIGURE 2.

FIGURE 4 is a partial longitudinal section view of a modified checking cylinder control mechanism with which the motion restraining effect of the checking cylinder may be selectively deactivated and with which the power stroke of the pneumatic cylinder may be instantly stopped at any point in the power stroke thereof.

FIGURE 5 is a longitudinal section view of a modified form of the checking cylinder with which velocity control of both the extension and contraction strokes of the pneumatic cylinder may be effected.

FIGURE 6 is a cross section view of the modified form of the checking cylinder taken along line 6—6 of FIGURE 5.

FIGURE 7 is a second cross section view of the modified checking cylinder taken along line 7—7 of FIGURE 5.

Referring now to the drawing and more particularly to FIGURE 1 thereof, there is shown a pneumatic drive cylinder 11 mounted on a stationary surface 12, in parallel relationship therewith, by means of L-brackets 13 which are disposed one at each end of the cylinder. Drive cylinder 11 is provided with a drive rod 14 extending axially from the forward end of the cylinder through a seal 16 thereat, the rod being coupled to a piston 17 within the cylinder and being longitudinally movable by the controlled admittance of high pressure air to a selected one of two air inlets 18 which are situated one at each end of the cylinder. The details of the structure of a pneumatic drive cylinder, as well as the method of operation thereof, are well understood within the art and accordingly will not be further described here, it being understood that the invention is applicable to the diverse types and sizes of drive cylinder which have been developed for various purposes.

In the absence of further provision, the drive cylinder 11 will exhibit the frequently disadvantageous property of varying with respect to rate of extension in accordance with variations in the resistance offered by the load being driven. In some circumstances a sudden change in the loading may give rise to oscillation about a given velocity value. Considering now the novel provision by which such effects are restrained and controlled, there is shown an auxiliary motion checking cylinder 19 secured to surface 12 at one side of the drive cylinder 11 and in parallel relationship therewith. The checking cylinder 19 is basically a second cylinder and piston which may be coupled to the primary drive cylinder for simultaneous motion therewith and which contains oil as the fluid medium. Inasmuch as oil is substantially incompressible, the movement of the system may be regulated by controlling the flow of oil through a passage connecting the two ends of the checking cylinder.

Referring now to FIGURE 2 in particular, the checking cylinder 19 is comprised of a hollow cylindrical barrel 21 closed at the forward end by a head assembly 22 and closed at the rearward end by an oil reservoir assembly 23. Head assembly 22 is formed by a rectangular block 24 having a stepped passage 26 which is coaxial with the barrel 21, the forward end of the barrel being inserted in the rearmost and largest section of the passage and being threadably engaged therein with an O-ring 27 being disposed between the two members to provide a fluid tight seal. An annular gland 28 is threadably engaged in the forward end of the passage 26, the gland having an axial bore 29 and having a flange 31 at the rearmost extremity which flange bears against an O-ring 32. A piston rod 33 extends through bore 29 of the gland 28 in alignment with the axis of barrel 21 and to prevent the escape of cylinder fluid through the gland an O-ring 34 is disposed in an annular groove around the circumference of bore 29. To prevent the entry of foreign matter into the cylinder, an annular piston rod scraper 36 is mounted in a groove at the forward face of gland 28, the scraper being coaxial with the rod 33 and being contacted with the surface thereof.

The oil reservoir assembly 23 which closes the rearward end of barrel 21 comprises a rectangular collar 37 having a circular opening 38 into which the rearward end of the barrel is fitted and secured. A rectangular rear head 39 is disposed against the rear face of collar 37, the rear head being of like outside dimensions and having a central opening 41 of less diameter than the opening 38. Extending rearwardly from rear head 39, coaxially with respect to the barrel 21, is a cylindrical tube 42, an annular projection 43 on the rear face of head 39 being entered into the forward end of the tube 42 which projection is provided with a circumferential groove mounting an O-ring 44. The tube 42 is preferably formed of transparent material in order that the oil level within the reservoir may be readily ascertained. To close the rearmost end of the tube 42, a rectangular cap 46 is disposed thereagainst, the cap having a circular raised area 47 on the forward face which raised area extends a short distance into the tube.

To secure the above described elements together, four bolts 48 are extended through the corners of cap 46, rear head 39 and collar 37. To force oil which is contained within the tube 42 into the rearward portion of barrel 21, an annular piston 49 is slidably disposed within the tube, the piston having a circumferential groove in which an annular packing element 51 is disposed to prevent the leakage of fluid around the piston. A hollow guide rod 52 extends forwardly from piston 49 through opening 41, the forward end of the rod being closed. A compression spring 53 is disposed coaxially within the guide rod 52, the rearmost end of the spring being entered in a well 54 in the forward face of cap 46 so that a forward force is exerted on the piston 49.

Within the barrel 21 a piston 56 is secured to the end of piston rod 33, the piston being disposed coaxially with respect to the rod and being provided with a circumferential groove in which an O-ring 57 is situated. Inasmuch as this embodiment of the invention is intended to restrain motion of a drive cylinder only with respect to the extension stroke thereof, and it is desired to permit rapid contraction of the drive cylinder, the piston 56 is provided with a check valve whereby the piston 56 may move rearwardly within the barrel 21 with minimum resistance. Such check valve is formed by longitudinal passages 58 in the piston which passages are spaced equidistantly from the axis thereof. An annular valve member 59 is slidably mounted on piston rod 33 forwardly from the piston 56 which member is urged against the forward face of the piston, to close the passages 58, by a compression spring 61 which spring is disposed coaxially on the piston rod and the forward end of which bears against an annular retainer 62 also mounted coaxially on the piston rod.

Considering now the effect of the above described structure, it may be seen that the piston 56 and piston rod 33 may move relatively freely in the rearward direction but that forward movement of these elements can only take place at a rate determined by the rate at which the hydraulic fluid may be released from the forward end of barrel 21. This property of the structure affords a mechanism for precisely controlling the movement of the piston rod and therefore the movement of the drive cylinder to which the piston rod may be coupled, inasmuch as the hydraulic fluid may be channeled from the forward end of the barrel 21 back to the reservoir 23 through a flow control valve which may be set for any desired rate of flow and which may be constructed to maintain a constant flow irrespective of the fluid pressure in the forward end of the barrel.

Considering now the adjustable valving means and fluid passages for accomplishing the foregoing, and with reference to FIGURES 2 and 3 in conjunction, a rectangular valve housing 63 is secured to the top surface of front head block 24. A transverse bore 64 extends across the front portion of housing 63, such bore having an enlarged central section 66 from which a passage 67 extends rearwardly. A pair of circular plugs 68, each having a circumferential O-ring 69, are secured in the bore 64 one adjacent each end thereof. A hollow cylindrical valve plunger 71, closed at a first end 72, is slidably disposed within the bore 64, the plunger being provided with an opening 73 in the lateral wall to form a throttling orifice for admitting a controlled flow of fluid into passage 67 as determined by the longitudinal position of the plunger in the bore. To urge the plunger 71 in a direction tending to increase the size of the throttling orifice, a compression spring 74 is disposed coaxially within the plunger and bears against end 72 thereof and against the oppositely situated plug 68.

The end of bore 64 adjacent the open side of plunger 71 is connected with the forward portion of barrel 21 by a passage 76 which passage extends downwardly through head block 24 to intersect with a transverse bore 77 in the block which latter bore 77 extends from passage 26 thereof to the lateral wall of the block. To provide a variable orifice within the foregoing fluid passage, a tubular valve member 78 is disposed coaxially in bore 77, the member having an inner bore 79 communicating between the end thereof and an opening 81 in the lateral wall which opening may be connected with passage 76 by appropriate rotation of the valve member. Valve member 78 is provided with a circumferential groove in which an O-ring 82 is disposed and is further provided with an axial projection 83 of reduced diameter which projection extends outward from block 24. To hold the valve member 78 in position, a side plate 84 is secured against block 24, which plate has an opening through which projection 83 extends. A circular control knob 86 is secured to the end of projection 83 whereby the variable orifice may be adjusted to determine the rate at which the drive cylinder is to operate.

A passage 87 extends upwardly through block 24 and housing 63 and connects passage 26, and thus the forward end of barrel 21, with the end of bore 64 adjacent valve plunger end 72. The valve plunger 71 is thus caused to regulate the flow of fluid from the forward end of the barrel 21 at a constant value determined by the setting of control knob 86. For any selected setting of control knob 86 there is a flow rate through opening 81 which will generate a pressure differential between ends of the valve plunger 71 in such a manner as to equal the spring force thereon. The plunger 71 will therefore vary the effective area of the throttling orifice 73 to maintain the specified flow rate irrespective of variations in the fluid pressure in the forward end of barrel 21 as caused by variations in the longitudinal force applied to piston rod 33. An increase in such force will tend to increase the flow through opening 81 thus increasing the pressure differential between ends of the valve plunger and causing the plunger to move to decrease the effective area of throttling orifice 73 whereby the original flow rate is maintained. Similarly a decrease in the force on the piston rod acts to decrease the pressure differential between ends of the valve plunger and thereby increases the effective area of orifice 73, again maintaining the original flow rate.

Fluid released through the throttling orifice 73 is returned to the reservoir 23 by means of a tube 88 which extends between valve housing 63 and a rectangular block 89 at the top of rear head member 39. The forward end of tube 88 enters an enlarged rear section of passage 67 and an O-ring 91 is disposed coaxially around the tube and held against the valve housing 63 by a seal plate 92 through which plate the tube is disposed. The rearward end of tube 88 enters a bore 93 in block 89, through an O-ring 94 mounted therein. The rearward end of bore 93 is utilized for filling the reservoir 23 with oil and is therefore closed by a threaded plug 96. Within the block 89 and rear head 39, a passage 97 extends downwardly and rearwardly to connect bore 93 with the forward region of reservoir tube 42 thereby completing the channel for returning oil from the forward end of the barrel 21 to the rearward end thereof.

To provide a convenient means for filling the forward end of barrel 21 with fluid, a passage 98 extends downwardly through valve housing 63 and block 24 and opens into passage 26 thereof, the passage 98 being to the rear of bore 64 and intersecting with passage 67. The upper end of the filler passage 98 is closed by a threaded plug 99 which is provided with a projection 101 extending downwardly through the passage 98, through an O-ring 102 therein, to close the lower portion of the passage and prevent the movement of fluid directly from barrel 21 into tube 88. Further appurtenances of the cylinder include a bleed valve comprising a threaded plug 103 closing a passage 104 in block 24 which passage is situated below the level of passage 26 and connects therewith. To prevent overfilling of the oil reservoir 23, the reservoir tube 42 is provided with a small vent aperture 106 at the upper surface and proximal to the end plate 46, the reservoir piston 49 thus acting to eject surplus fluid from tube 42.

Referring now again to FIGURE 1, the checking cylinder 19 is coupled to the pneumatic drive cylinder by means of a link 107 which is secured to drive rod 14 of the pneumatic cylinder by nuts 108 and which extends laterally from rod 14 to piston rod 33 of the checking cylinder, the link being similarly secured to the piston rod by means of nuts 109. Inasmuch as this mode of coupling the two cylinders creates an eccentric loading of the drive rod 14, it is preferable that such rod be further restrained as by a guide 111 secured to the surface 12 and engaging the drive rod at a point forward from link 107. It should be understood that other methods of coupling the checking cylinder 19 with the primary drive cylinder are possible. The two cylinders may, for example, be connected in tandem or alternately the checking cylinder may be situated remotely from the primary drive cylinder and connected therewith only through the load mechanism which the primary cylinder is driving. The essential condition is that the power stroke of the drive cylinder act, either directly or through intervening mechanism, to withdraw the piston rod 33 from the checking cylinder. As has been hereinbefore described such withdrawal of the piston rod 33 from the checking cylinder cannot exceed a fixed rate determined by the setting of control knob 86 and accordingly the power stroke of the drive cylinder must occur at a fixed pre-determined rate irrespective of variations in the loading thereof.

Referring now to FIGURE 4, there are shown additional fixtures for the valve housing 63, which housing has been hereinbefore described with reference to FIGURES 2 and 3, by which the restraining action of the checking cylinder may be relieved for any selected portion of the power stroke whereby such stroke proceeds rapidly and by which the power stroke may be instantly and accurately stopped at any selected point.

Considering first the skip mechanism, or provision for controllably releasing the restraining action of the checking cylinder, the plug has been removed from passage 98 in the valve housing 63 and a stepped chamber 112 substituted therefor, the chamber having a threaded lower portion 113 of reduced diameter which is engaged in the upper portion of passage 98. A stepped plunger 114 is slidably disposed within chamber 112, the plunger having an annular upper portion 116 forming a piston and having a lower portion 117 of reduced diameter which lower portion extends downwardly through the chamber lower portion 113. A first O-ring 118 is disposed around the circumference of the plunger upper portion 116 and a second O-ring 119 is disposed around the lower portion 117 thereof. The plunger 114 thus may be moved between two positions in chamber 112 at the upper of which positions the passage 98 is unblocked and the flow controlling mechanism as hereinbefore described is by-passed and the power stroke of the drive cylinder may proceed at a rapid rate. At the lower position of plunger 114, the lower portion 117 thereof blocks the passage 98 and the checking cylinder operates as hereinbefore described.

To control the position of the plunger 114, a cover 121 is secured against the upper surface of chamber 112 with an O-ring 122 being disposed between the two members. Cover 121 is provided with a central threaded opening 123 to provide for connection with a remote source of compressed air. The admission of compressed air to the opening 123 will act to drive the plunger 114 downward causing the checking cylinder to function to control motion of a drive cylinder. Release of the air pressure at opening 123 will allow the oil pressure within passage 98 to drive the plunger 114 upward thereby by-passing the flow control mechanism and allowing a rapid motion of the cylinder.

Considering now the provision for precise stopping of the drive cylinder, the tube 88' leading from valve housing 63 to the oil reservoir at the rearward end of the cylinder is made shorter than that previously used in order that a rectangular stop mechanism housing 124 may be secured to the rearward side of the valve housing, the forward end of tube 88' being entered into a passage 126 in the housing 124 through an O-ring 127 disposed therein. A vertical bore is situated in housing 124 which bore is terminated near the bottom of the housing and which has a threaded upper portion 128 and a lower portion 129 of lesser diameter. Passage 126 connects with the upper portion 128 of the bore and the passage 67 in valve housing 63 is connected with the lower portion 129 of the bore by an additional passage 131 thereby providing a fluid channel from the valve housing into the tube 88'.

A second chamber 132 is secured to the top surface of housing 124 by means of a threaded annular projection 133 thereon which extends downward into bore 128 and which is engaged therein. A stepped plunger 134 is slidably disposed within the second chamber 132 which plunger has an upper portion forming a piston within the second chamber and which has a lower portion extending downwardly through projection 133. An O-ring 136 is disposed in a groove around the upper portion of the plunger and a second O-ring 137 is disposed in a groove around the lower portion thereof.

Plunger 134 may thus move between two extreme positions at the uppermost of which the fluid channel through housing 124 is unobstructed and at the lowermost of which the lower portion of the plunger enters the lower portion 129 of the vertical bore within the housing and thereby stops the flow of oil through the housing. Blockage of the fluid flow through housing 124 acts instantly to stop and lock the motion of the checking cylinder and thus to stop and lock the motion of the drive cylinder. To provide a convenient mechanism for controlling the action of the plunger 134, a threaded cap 138 is used to close the upper end of second chamber 132, the cap having a threaded central opening 139 and being provided with an O-ring 141 in a circumferential groove to seal the upper end of the second chamber. A remotely situated source of compressed air may be connected with the upper end of second chamber 132 by a suitable connection to opening 139 and by applying such compressed air to the second chamber, the plunger 134 will be driven downward to stop motion of the apparatus in the manner described. Upon release of the air pressure, the oil within the housing 124 will force the plunger 134 upward thereby reinitiating the motion of the apparatus.

Referring now to FIGURES 5, 6, and 7 in conjunction, there is shown a modified embodiment of the invention which is capable of controlling the motion of a drive cylinder in each direction. The apparatus is provided with a barrel 21' similar to that previously described which barrel is closed at the forward end by a head assembly 22' also similar to that previously described. A piston 142 is slidably disposed in barrel 21' which piston is, in this instance, unperforated by fluid passages. A piston rod 33' extends forwardly from piston 142 through the gland 28' in the head assembly. A valve housing 63' is secured to the top of the head assembly 22', the housing and associated flow control mechanism being similar to that described except that as shown in FIGURE 5 the plug 143 closing the top of the passage 98' which connects with the forward end of the barrel 21' with passage 67' is in this instance terminated just above the level of passage 67'. The lower portion of passage 98' specifically the portion within the head block 24', is slightly larger than the upper portion of the passage and a check valve sphere 144 is disposed therein. To prevent the sphere 144 from dropping through passage 98', a pin 146 is positioned transversely in the passage.

Considering now the modifications at the rearward end of the cylinder, a differing rear head member 147 is disposed thereat, the head member 147 being provided with a stepped axial passage, the more forward section 148 of which is internally threaded and which receives the rearward end of barrel 21'. The central portion of the passage through member 147 includes a first section 149 forward from a second section 151 of reduced diameter, the rearmost portion 152 of the passage being of greatly enlarged diameter. A rectangular plate 153 is secured against the rear face of member 147, the plate having a central circular bore 154 of less diameter than the rearmost portion 152 of the passage through member 147.

An oil reservoir assembly 23', similar to that previously described, is secured to the rear face of plate 153 by bolts 48', the tube 52' of the assembly extending forwardly through bore 154 of plate 153. To provide for filling of the reservoir, a threaded bore 156 extends downwardly from the top of plate 153 and connects with a passage 157 running through the plate, a threaded plug 158 being employed to close the bore.

Secured to the top of rear head member 147 is a second valve housing 159 similar to valve housing 63' and containing a similar flow controlling mechanism, and similar passages for connecting with the adjacent end of barrel 21', the housing 159 being oriented oppositely from the position of housing 63' so that a straight tube 88' will connect the passage 67' with the corresponding passage 161 of housing 159.

A passage 162 extends downwardly from passage 161, through valve housing 159 and rear head member 147, and connects with a passage 163 in the head member which passage 163 opens into passage 152 thereof. A check valve 164 is disposed in passage 149 of the head member 147 to limit the flow of oil in the central channel of the head member to a direction leading into the barrel 21'.

In operation, motion of the piston rod 33' outward from the cylinder is regulated in the manner previously described, the check valve sphere 144 acting to close passage 98' and thus to prevent fluid from by-passing the flow control mechanism. During the outward motion of the rod 33', oil from the forward end of the barrel 21' returns to the rearward portion thereof through the flow control mechanism within housing 63', tube 88', passages 161 and 162 of valve housing 159, and passages 163, 152, 151 and 149 of rear head member 147.

Upon movement of the piston rod 33' into barrel 21', check valve 164 closes forcing oil in the rearward portion of the barrel to flow through the rate controlling mechanism in valve housing 159, the oil being subsequently transmitted to the forward end of the barrel through passage 161, tube 88', passages 67' and 98' of housing 63' and front head block 24'. Thus the cylinder of FIGURES 5, 6 and 7 acts to regulate the velocity of an associated drive cylinder with respect to both the expansion and contraction stroke thereof and, inasmuch as separate controls are provided for each motion, the rates of the two strokes can be made to differ.

It will be understood that the skip and stop mechanisms as described in connection with FIGURE 4 may be utilized with either or both of the housings 63' and 159 of the apparatus of FIGURES 5, 6 and 7.

What is claimed is:

1. An auxiliary cylinder for regulating the motion of a fluid powered drive cylinder, said auxiliary cylinder comprising, a cylindrical barrel, a piston slidably disposed within said barrel and forming a fluid barrier therein, a piston rod slidably and sealingly extending through an end of said barrel and connecting with said barrel piston therein, a hydraulic fluid filling said barrel on each side of said barrel piston, a control valve housing having a fluid orifice therein, a movable element disposed within said housing and positioned to vary the size of said orifice, a first conduit transmitting fluid pressure from a first end of said barrel to a first side of said movable element, a second conduit transmitting fluid from said first end of said barrel to the second side of said movable element and further transmitting said fluid to said orifice, a resilient element exerting an additional force on said second side of said movable element, a throttling valve controlling fluid flow through said second conduit, and a fluid return conduit connecting said orifice with the second end of said barrel.

2. An auxiliary cylinder for regulating the motion of a fluid powered drive cylinder as set forth in claim 1 and wherein said control valve housing forms a chamber, said orifice being situated in a wall thereof, and wherein said movable element is disposed in said chamber and being slidable therein, said resilient element being a spring extending between an end of said plunger and an end of said chamber.

3. An auxiliary cylinder for regulating the motion of a fluid powered drive cylinder as set forth in claim 1 and comprising a hydraulic fluid reservoir having a first end communicated with said fluid return conduit and having a vent in the lateral wall at a point remote from said first end, a slidable fluid barrier disposed within said reservoir, and a spring urging said barrier towards said first end of said reservoir whereby surplus fluid is ejected from said vent and the remainder of said fluid is forced towards the second end of said barrel.

4. A motion regulating mechanism for a fluid powered drive cylinder comprising, a cylindrical barrel having a port at each end and having an opening at a first of said ends, a piston slidably disposed in said barrel and forming a fluid barrier therein, a slidable piston rod coupled to said piston and projecting through said opening at said first end of said barrel, a hydraulic fluid filling said barrel, a control valve of the class maintaining a constant selected flow rate, said valve having an inlet communicating with the port at said first end of said barrel and having an outlet, a return conduit connecting said control valve outlet with the port at the second end of said barrel, and a selectively operable second valve controlling fluid flow through said return conduit, said second valve being normally open and having a closed setting in which flow through said return conduit is blocked.

5. A motion regulating mechanism for a fluid powered drive cylinder comprising, a cylindrical barrel having a port at each end and having an opening at a first of said ends, a piston slidably disposed in said barrel and forming a fluid barrier therein, a slidable piston rod coupled to said piston and projecting through said opening at said first end of said barrel, a hydraulic fluid filling said barrel, a control valve of the class maintaining a constant selected flow rate, said control valve having an inlet communicating with the port at said first end of said barrel and having an outlet, a return conduit connecting said valve outlet with the port at the second end of said barrel, an additional fluid conduit connecting said first end of said barrel with said second end thereof, and a second selectively operable valve controlling fluid flow through said additional conduit, said second valve being normally closed and having a setting at which said additional conduit is opened whereby said control valve is by-passed and motion of said drive cylinder may occur without a substantial degree of impedance by said regulating mechanism.

6. In a mechanism for regulating the motion of the drive rod of a fluid powered drive cylinder with respect to both the extension and contraction strokes thereof, comprising a cylindrical barrel, a slidable piston disposed in said barrel and forming a fluid barrier therein, a slidable piston rod extended through an end of said barrel and connected with said piston therein, a hydraulic fluid filling said barrel, a first control valve having an intake communicated with a first end of said barrel and having an outlet, a second control valve having an intake communicated with the second end of said barrel and having an outlet, a single fluid return conduit connecting said outlets of said first and second control valves, a first check valve connected between said return conduit and said first end of said barrel and limiting fluid flow to a direction towards said first end of said barrel, a second check valve connected between said return conduit and said second end of said barrel and limiting fluid flow to a direction towards said second end of said barrel, a fluid reservoir communicating with said return conduit.

References Cited in the file of this patent

UNITED STATES PATENTS

| | | |
|---|---|---|
| 1,007,377 | Nielsen | Oct. 31, 1911 |
| 1,205,818 | Thomas | Nov. 21, 1916 |
| 2,265,009 | Chenault | Dec. 2, 1941 |
| 2,488,992 | Taylor | Nov. 22, 1949 |
| 2,674,138 | Mize | Apr. 6, 1954 |
| 2,838,140 | Rasmusson et al. | June 10, 1958 |